United States Patent [19]
Van Huisen

[11] 3,889,473
[45] June 17, 1975

[54] GEOTHERMAL CHANNEL AND HARBOR ICE CONTROL SYSTEM

[76] Inventor: Allen T. Van Huisen, 29456 Indian Valley Rd., Rolling Hills Estates, Calif. 90274

[22] Filed: Mar. 8, 1974

[21] Appl. No.: 449,351

Related U.S. Application Data

[62] Division of Ser. No. 220,801, Jan. 26, 1972, Pat. No. 3,807,491.

[52] U.S. Cl. .................................. 61/1 R; 61/36 A
[51] Int. Cl. .......................... E02b 5/04; E02b 3/00
[58] Field of Search ............... 61/1 R, 36 A, 50, 6; 166/DIG. 1; 165/45, 1

[56] References Cited
UNITED STATES PATENTS

| | | | |
|---|---|---|---|
| 339,054 | 3/1886 | Gordon, Jr. | 61/6 |
| 1,816,511 | 7/1931 | Barnes | 61/1 R |
| 2,417,519 | 3/1947 | Persson et al. | 61/6 |
| 2,827,268 | 3/1958 | Staar | 61/1 R |
| 3,521,699 | 7/1970 | Van Huisen | 165/45 |
| 3,679,264 | 7/1972 | Van Huisen | 165/45 |

OTHER PUBLICATIONS

"Changing Our Climate" by C. Rougeron, The Detroit News, Dec. 19, 1957.

*Primary Examiner*—Robert L. Wolfe
*Assistant Examiner*—Alex Grosz
*Attorney, Agent, or Firm*—Marvin E. Jacobs

[57] ABSTRACT

A thermo-arctic sea passage is formed and maintained by providing a series of geothermal wells spaced along the intended route. Heat energy transferred from a deep geothermal strata to the surface melts the ice to form a water channel. Reformation of ice is inhibited by efficient and active water movement and wave action induced by wind action.

9 Claims, 9 Drawing Figures

GEOTHERMAL CHANNEL AND HARBOR ICE CONTROL SYSTEM

CROSS REFERENCE TO RELATED APPLICATION

This application is a division of Ser. No. 220,801, filed Jan. 26, 1972, now U.S. Pat. No. 3,807,491.

BACKGROUND OF THE INVENTION

1. Field of the Invention

The present invention relates to a system utilizing earth contained heat energy to thaw ice-covered waterways sufficiently to permit navigation and use of normally ice bound harbors. More particularly, this invention relates to the use of naturally occuring geothermal energy which exists beneath the land and water surfaces to control ice formation and permit conventional navigation into and through arctic or frozen regions.

2. Description of the Prior Art

Much of man's present commerce and communication leads them over the North Pole except in the shipping industry which has not found a solution to the problem of frozen waters. During the winter, the temperature rises to only about −51°F during the 2 hours of sunshine. The coastline is one mass of large ice heaves. A recent experiment with the S.S. Manhatten ice breaker and associated air and ground communication support has proven that it is impractical to maintain shipping lines open through the frozen waterways of the passage from the north slope of Alaska to the Great Lakes.

A year round passage from the Arctic regions of Alaska to the southern portions of the United States is immediately required. Fossil fuel estimated at 10–100 billion barrels underlies Alaska's remote north slope which extends between Brooks range and the Arctic Ocean. This reserve equals about ⅓ of the combined reserve of all other oil producing states. Private investors have proposed an 800-mile pipeline to move the crude to the year round port of Valdez and the Canadians propose an alternate pipeline route via Edmundton.

Threading over and through the tundra, either pipeline would carry crudes still hot from the earth's depths. Friction and pumping would keep the oil at about 180°F. Tests have shown that the conduit if buried in permafrost, even when wrapped with insulation, will thaw the frozen ground. Sagging the line would break and spill tons of gummy liquid. Fault zones also pose a danger of breakage by earthquake. The 48-inch pipeline would run for 800 miles across the tundra and through the Brooks range. Some segments of the line would be buried, others elevated. It would cross 350 streams and rivers. It's construction would require thousands of workers, fleets of machinery and massive quantities of material. It is estimated that the line would cost 2 billion dollars.

There are many questions and concerns relating to the construction of this pipeline. It could alter the migration patterns of thousands of carribou. Oil is likely to escape into the Prince William Sound where oil will be loaded onto tankers and other Pacific Harbors where it will be unloaded. If oil was spilled it could readily destroy the fish and wildlife in the region of the spill.

It is recognized that the earth is naturally endowed with a vast reservoir of residual geothermal heat energy beneath the surface of the earth's crust. Sometimes geothermal heat escapes into shallow stratum and originates geysers, boiling mudpots, steam vents and warm springs which are known throughout many areas of the world.

The earth's geothermal gradient coupled with the specific heat of the average sedimentary rock demonstrates that there is a vast amount of heat energy flowing both towards and parallel to the surface of the earth through the upper few miles of the earth's crust. The source of heat in the upper few miles of the earth's crust may be from the outward flow of heat from the core of the earth, from the cooling igneous magmas, from the disintegration of radioactive elements, from the frictional heat formed during diastrophism (the rubbing together of individual grains), and from the exothermal chemical reactions that take place within permeable reservoir rocks.

The mean heat flow from the interior of the earth to the surface of the earth in continental North America averages approximately $1.2 \times 10^{-6}$ calorie per centimeter per second. Zones or areas with much higher heat flow are known. A zone approximately 50 to 100 miles wide and several thousand miles long extends from Easter Island in the Pacific into the Gulf of California and on into the southern part of the United States, where the heat flow is 5 to 8 times normal. Substantial areas of the world are underlayed by rocks of abnormally high temperatures. In many places heat flow in these regions is as much as 10 times that of the normal crust.

The average heat flow indicates a temperature gradient in a geological region of average rock type of approximately 1°C per 100 feet of depth. In areas of abnormally high heat flow, the temperature gradient may be as much as 10°C per 100 feet of depth, or more. In areas of hot spring activity or recent volcanic activity, substantially higher temperature gradients may be found over extensive areas. In many regions, temperatures of as much as 500°C may be found at depths of 10,000 feet or shallower. A substantial amount of energy is stored in such a volume of hot rock.

In contrast to the earth's vast internal heat reservoir, the Arctic regions are usually remote and forbidding to man's mastery with material technology because of the extreme weather and climate variations which restrict navigation, limit usage of seaports and harbors and generally prevent development and commerce of such regions.

Geologically and geomorphically the region is basically an extension of the area south of it. The rock types and evolutionary events through geological time are comparable to those found elsewhere on the earth with temperature or tropical indications. However, the Arctic regions differ from temperate regions due to the cold climate, varying day-night cycle and magnetic and ionospheric peculiarities.

The distribution and magnitude of the geothermal resources within the sub-strata of the polar regions can readily be determined by aerial radar and infrared photography to aid in selection of optimum sites for wells and to determine the route of the sea passage. The general extent of this resource is established throughout the world by recognized geothermal gradient of approximately 2°F for each 100 feet of penetration into the earth's depths. However, as much as 40° to 10°F per 100 feet of depth is known in hyperthermal deposits in the vicinities of surface geothermal phenomena resulting from tertiary or quanternary age, especially Caldera structures, cones and volcanic vents.

OBJECTS AND SUMMARY OF THE INVENTION

It is therefore an object of the invention to provide for maintaining navigation routes and/or harbors open in frozen regions of the earth's surface.

A further object of the invention is the provision of the system for safe, efficient and low cost delivery of crude from Arctic regions to world markets.

Yet another object of the present invention is to provide a method and system for thawing ice covered waterways sufficiently to permit passage of ships in and out of ports and harbors or across the Arctic regions of both northern and southern polar areas.

These and other objects and attendant advantages of the invention will become apparent as the description proceeds.

A thermo-arctic passage is provided in accordance with the invention by providing a series of geothermal wells spaced along the intended route of the passage and transferring heat from a deep geothermal strata to the surface to melt the ice and form a water filled shipping channel. It is recognized that the differences in the heat received from geothermal sources within the earth affect the extended depths to which surface ice will form. Geothermal wells create the means for massive release of the earth's interior heat and the distribution of such released energy into Arctic surface waters is an effective ice melting and ice forming controlling agent.

It is known that ice formation is a crystallization phenomena that is promoted by quiescent conditions. According to another aspect of the invention, reformation of ice is prohibited by efficient and active circulation of the water within the channel which can be in conjunction with removal of water from the channel to a deep heat exchanger within the well and recycling the heated water to the channel. Furthermore, since wind is the principal force responsible for wave and water motion, the natural prevailing winds can also be utilized to maintain wave action in the channel and melted water to retard crystallization and ice formation.

The wells may be drilled into geothermal stratum beneath the shallow water surface adjacent the beach or on the beach itself. The hot fluid discharge may be provided into the water surface beneath the ice which will serve to melt the ice covering. The permafrost layer in the earth is limited to forming beneath land surfaces. Therefore, drilling the geothermal wells off-shore with the attendant circulation of hot geothermal fluid or geothermally heated fluids would not present a problem relating to or affecting perma-frost.

A further embodiment of the invention relates to the discharge of the oil directly onto the surface of the water channel, once it is formed, and utilizing the motion of the water downstream to carry the oil to market. The oil is discharged from an oil well at a temperature of about at least 150°F. This added heat will also implement the heating of the channel and reduce the requirement of geothermally supplied fluid. Such a system can also be used as a shipping channel for ships carrying other cargo. In fact, such a passage from Alaska to the Great Lakes would provide a very short and economical shipping route from the eastern continents to North America which will provide additional revenue for the system.

In the just described embodiment since oil is lighter it will remain floating on top of the water channel. The ice barrier bounding the channel will contain the oil within the channel. The contained oil will oppose little pollution threat and can be recovered from the channel at strategic locations for barging to market areas. The moving oil film will prevent refreezing of the channel since it is on the surface exposed to the cold air environment and has a much lower freezing point than water.

The invention will now become better understood by reference to the following detailed description when considered in conjunction with the accompanying drawings.

DESCRIPTION OF THE PREFERRED EMBODIMENTS

Figure 1:
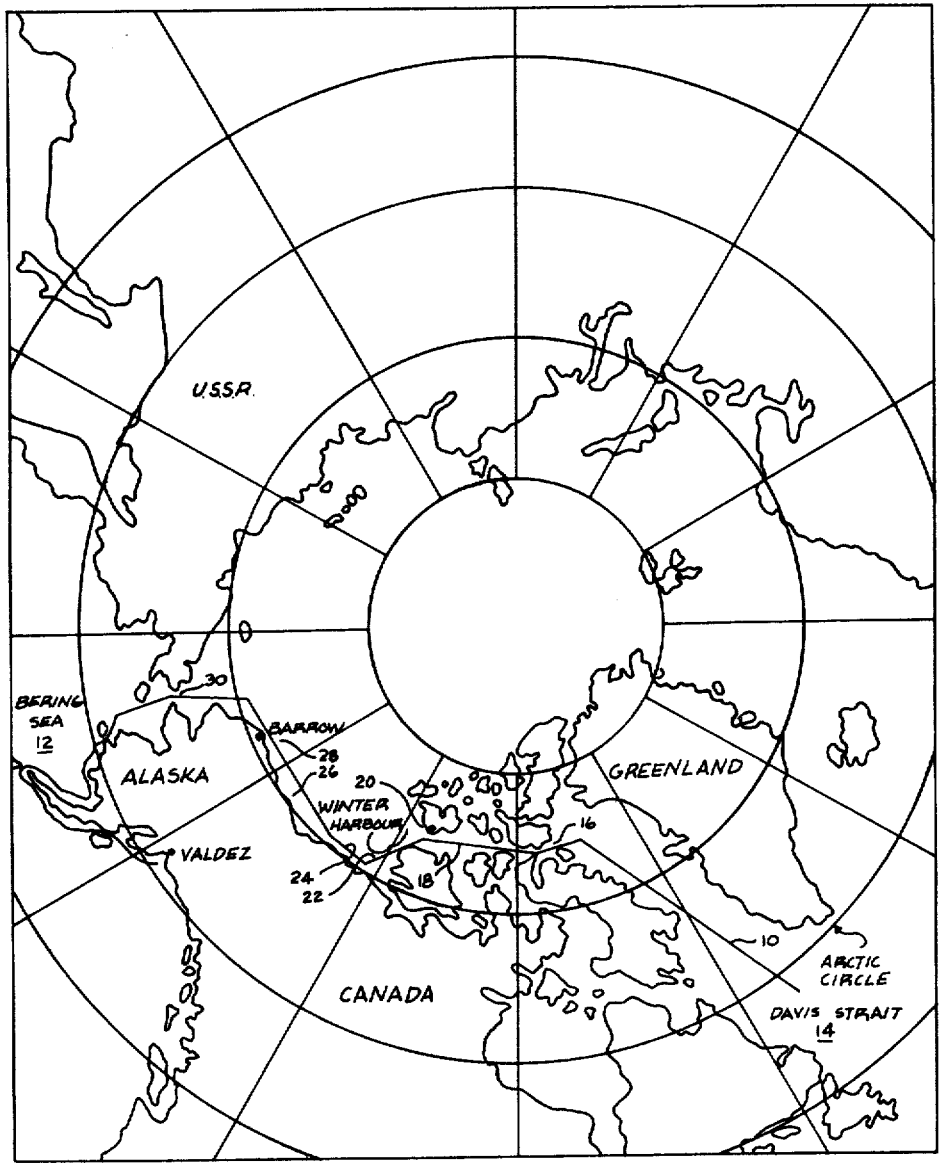
FIG. 1 is a map showing the route of an arctic sea-passage.

Referring now to FIG. 1, a typical route for a geothermal sea passage is illustrated. The sea passage 10 will maintain an open passage from the Bering Sea 12 to the Davis Strait 14. The passage can generally follow the Northwest Passage route of the S.S. Manhatten from the Davis Strait through the Lancaster Sound 16, Barrow Strait 18, Viscount Melville Sound 20, Prince of Wales Strait 22 into the Admundsen Gulf 24 and thence along the coast of Canada and Alaska past Prudhoe Bay 26, Barrow 28, and across the Chukchi Sea, through the Bering Strait 30 in the Bering Sea 12. An alternate or additional route could extend from Prudhoe Bay or Point Barrow on the North Slope through the Bering Strait, past Nome, around the Alaska Peninsula and southward to the Prince William Sound and the warm water open port of Valdez.

Figures 2, 4:
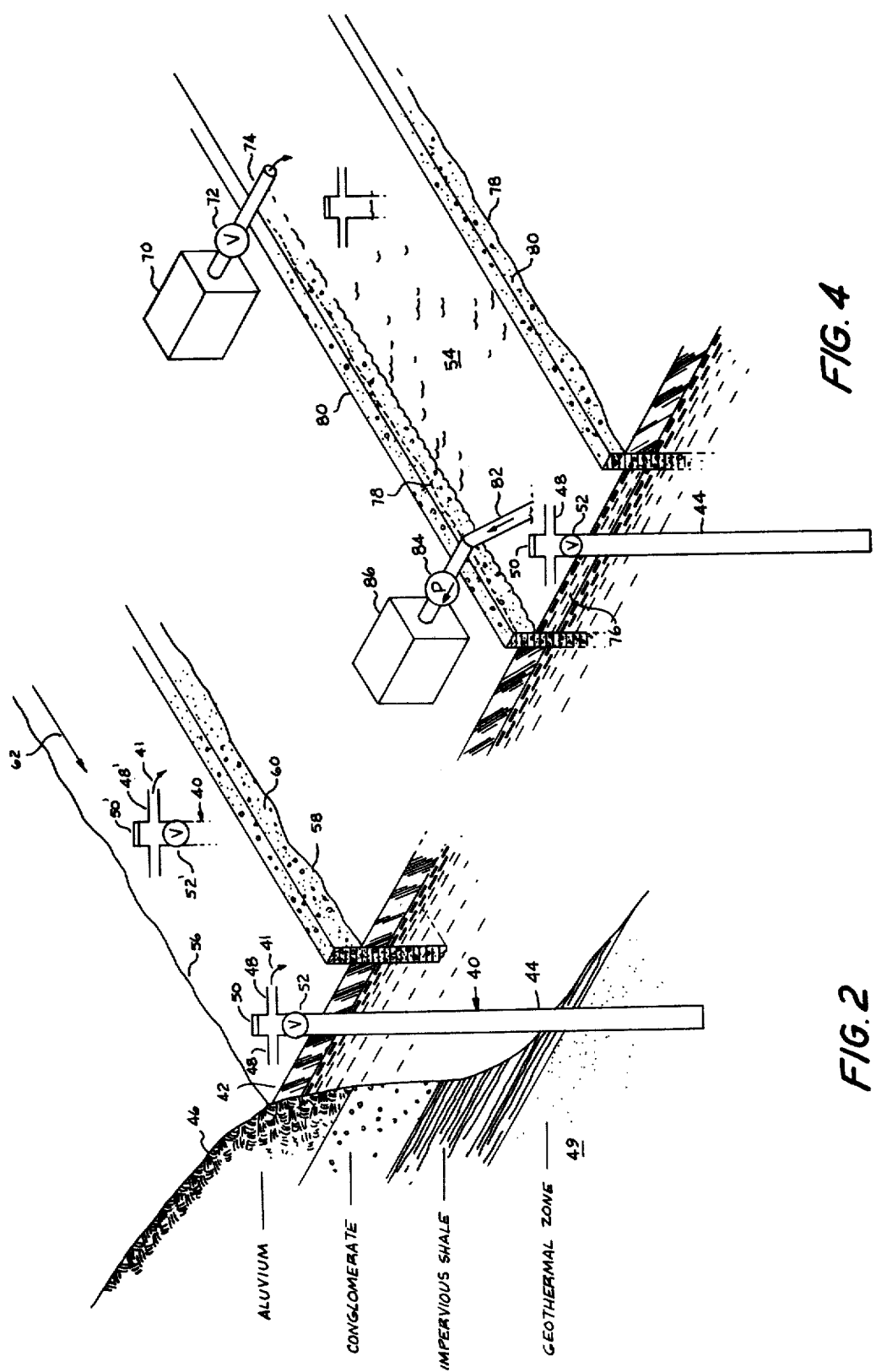
FIG. 2 is a sectional and perspective view of an embodiment of a geothermal sea-passage in accordance with this invention.
FIG. 4 is a perspective view of an oil-layer embodiment of the inventive geothermal sea-passage.
Figure 3:
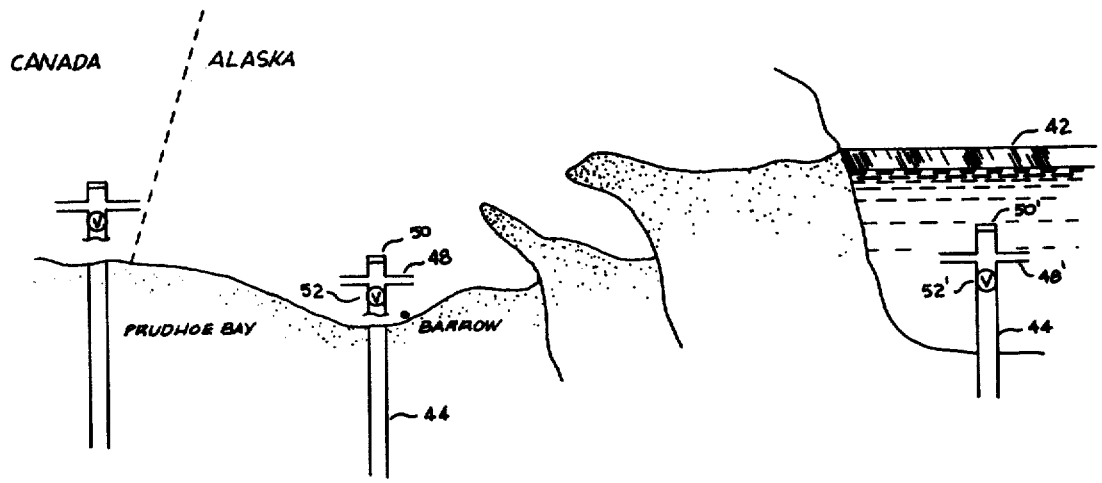
FIG. 3 is a further sectional view of the passage of FIG. 2.

Referring now to FIGS. 2 and 3, the geothermal sea passage system according to the invention includes a plurality of geothermal wells 40 spaced along the intended route and designed to discharge heated fluid 41 in contact with the ice layer 42 covering the waterway. The wells may be drilled on the shoreline and discharge into the channel or the wells may be drilled through the water under the channel. A map of the Arctic Ocean floor indicates that the average water depth is about 100 feet adjacent the shore line.

The fluid, preferably at a temperature of at least 100°F. can be discharged onto the top surface of the ice layer 42 or can be discharged onto the bottom surface of the ice layer. The geothermal well includes a casing 44 extending from the surface 46 into a geothermal zone 49. The fluid is heated within the zones and rises by convection or natural pressure through the casing and is discharged through outlets 48. The top of the casing is provided with a cap 50 and a valve 52 for controlling the rate of discharge.

The outlet 48, cap 50 and valve 52 may be above the surface of the ice 42 or the outlet 48', cap 50' and valve 52' may be below the ice layer 42. As the heated fluid melts the ice layer 42, an open water shipping channel 54 is formed. The channel is preferably at least 80 feet wide to permit passage of large tankers and cargo ships. The water depth should be at least 50 feet to permit safe passage of large vessels.

The channel is preferably bounded on one edge by the shoreline 56 and the other edge by the edge 58 of the melted ice layer 42. In order to prevent excessive widening of the channel and to conserve heat, the edge 58 may be lined with a water impermeable barrier 60 of thermal insulation such as a wall 60 of lightweight concrete. The wall 60 should extend above the wave and water line and channel the warm water downstream. The channel 54 is preferably disposed along the direction 62 of the prevailing winds. The wind, wave action and downward movement of the heated fluid will all cooperate to initially etch the channel 54 through ice layer 42 and will also retard and prevent the refreezing of the waterway once it is open.

Referring now to FIG. 4, in a further embodiment of a thermal sea passage, the thermal requirements from the geothermal sources can be reduced by taking advantage of the heat content of the crude oil. Crude oil on the North Slope typically leaves the ground at a temperature above 150°F. Once the channel 54 is formed, the oil may be controllably discharged into the channel from storage tank 70 by means of the valve 72 in discharge pipe 74. An oil layer 76 will form on top of the water way and will be contained by ice barriers 78 or the thermal insulation liners 80.

The contained oil poses little pollution threat and will not interfere with navigation in the channel 54. The channel 54 is preferably disposed offshore and bounded by ice barriers on each side so that the floating oil cannot foul the beaches or shore line. The oil is simply recovered downstream by pumping the oil from the channel by means of an inlet pipe 82 extending into the oil layer 76 and is pumped by means of pump 84 into a storage tank 86 or into a pipeline or barge or tanker, not shown.

The Arctic Ocean is unique in that over 80 percent of its surface remains ice covered throughout the year and it is essentially entirely frozen over from November to June. This fact profoundly influences the climate of the region. Sea ice forms by the freezing of sea water adjacent the shoreline. Normal sea water at 35 percent salinity freezes at a temperature of −1.9°C. Unlike fresh water which reaches its maximum density at +4°C the temperature of maximum density of sea water depends on salinity and the temperature of maximum density lies below the freezing point. Therefore, vertical convection induced by cooling at the surface may reach considerable depth. The growth rate of sea ice depends primarily on surface temperature depth of snow cover and turbulent heat flux in the underlying water. In the central Arctic, the seasonal ice cover is about 2 meters. The thermal parameters of sea ice and especially shore ice is fairly similar to permafrost and are listed in the following table.

| PARAMETER | WATER/ICE FROZEN | THAWED |
|---|---|---|
| Thermal conductivity (mcal per cm sec °C) | 5.4 | 1.2 |
| Volumetric specific heat (cal per cm³ °C) | .45 | 1.00 |
| Thermal diffusivity (cm² per sec) | .012 | .0012 |
| Latent heat per unit volume (cal per cm³) | 72 | |
| Moisture content (percent wet weight) | 100 | |
| Moisture content (percent dry weight) | 0 | |
| Moisture content (percent by weight) | 100 | |
| Wet density (gm per cm³) | .9 | 1.0 |
| Wet density (lb per cu ft) | 56.2 | 62.4 |

It can be expected that in two to three years a continuous flow of heated geothermal fluid would thaw at least a 10 feet thick layer of sea ice into the desirable 80 foot wide channel. The rate of thawing can be increased by drilling wider and deeper wells or by providing more numerous wells along the path of the channel.

The type of geothermal well to be utilized at any particular location along the route will depend on the prevailing geological conditions underlying the shoreline. Coastal low lands bordering the Arctic Ocean and the Chukchi Sea and Bering Sea range in altitude from sea level at the coast to about 200 feet above sea level at their landward margin. Most of the coastal plain bordering the Arctic Ocean is fringed with offshore bars and islands. The beach extends along the shore of the Chukchi Sea past Barrow village and Barrow to a spot that extends five miles into the Arctic Ocean to Point Barrow. A shaft about 100 feet from the ocean beach near Point Barrow was dug through frozen clay, gravel and sand. Salt water at a temperature −9.4°C seeped into the hole from the lower sand and fine gravel.

The base of permafrost near the beach at Barrow is 667 feet below the land surface. Permafrost temperature below the level of zero annual amplitude was about −8°C in a hole 300 feet from the shore and was about −4°C in a hole at the edge of the ocean.

Permafrost in the Arctic coastal plain ranges in thickness from 500 to 1330 feet and its minimum temperature ranges from −5.5°C to −10.6°C.

Ground water in the eastern Brooks range comes from springs that are associated with faults in limestone. The largest known spring in the eastern Brooks range comes from springs that are associated with faults in the limestone. The largest known springs have a perennial flow at a temperature of 6° to 11°C. Springs prevalent in the area are classified as hot springs (37°–100°C), warm and cold springs (0°–37°C) and saline springs (generally less than 30°C). The hot springs are limited to the area south of the Brooks range. Known springs of the continuous-permafrost zone north of the Brooks range range in temperature from 0° to 11°C. Numerous geothermal investigations have been conducted from the viewpoint of determining the effect of subsurface heat on the extent and character of permafrost. Geological investigations indicate that the ice cap is sunken and flatened which pushes up the geothermal zone and makes it more accessible for tapping for use in the geothermal sea passage of the invention.

In many areas of the earth, deep circulating water is at depths as deep as 10,000 feet or more. The rising heated water carries this heat to shallow depths heating large volumes of rock. Enormous amounts of energy are contained in the deep masses of heated rock which in some cases total many cubic miles. The total heat energy in one cubic mile of rock at 10,000 feet depth may be equivalent in energy to 300 million barrels of oil. However, most of the deep magmatic bodies are not contacted by deep circulating underground water sources which are essential to raise heat to shallower strata from which it can be readily recovered. In areas of hot spring activity or recent volcanic activity, substantially higher temperature gradients may be found over extensive areas. Furthermore, the natural combination of the geothermal hot zone in contact with water forms a heated body of water and steam which can act as a carriage to raise the heat to the surface. However, such a combination of geological conditions is only found at selected areas of the Arctic.

Figure 5:
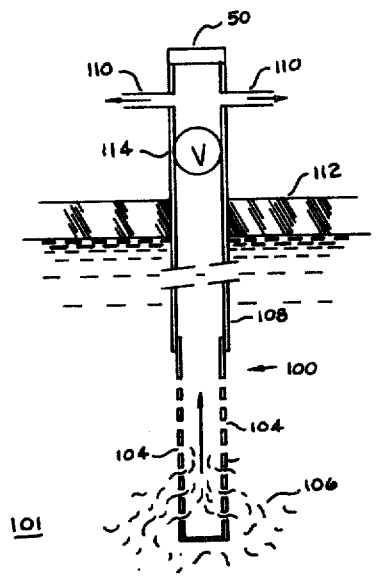
FIG. 5 is a schematic view of a flowing geothermal well useful in the geothermal sea-passage system.

Therefore, the type of well to be drilled at any location along the route will depend upon the underlying geological conditions. Referring now to FIG. 5, in an area of deep lying wet geothermal energy, the portion 100 of the well casing extending into the wet geothermal zone 101 may contain perforations 104 or the bottom of the casing may be open. The hot geothermal fluid 106 enters the perforations 104, rises through the casing 108 and is discharged through outlets 110 onto the ice layer 112. The flow of fluid can be controlled by means of valve 114.

Figure 6:
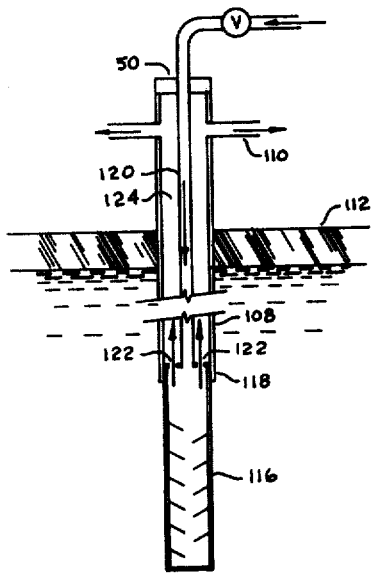
FIG. 6 is a schematic view of a closed heat-exchanger geothermal well.

In an area overlying a dry geothermal zone the geothermal well as illustrated in FIG. 6 can include a closed end heat exchanger 116 disposed within the geothermal zone 101. The heat exchanger 116 is connected to the casing 108 at 118. A source of heat exchange fluid such as fresh water is delivered to the heat exchanger 116 through central conduit 120. The heated fluid leaves the exchanger 116 through outlet ports 122, rises through the annulus 124 of the casing 108 and is discharged onto the ice layer 112 or into the channel 54 through outlet pipes 110. The use of fresh feed water or other pure coolant minimizes scaling and corrosion of the casing 108 and extends the useful life of the well.

Figure 7:
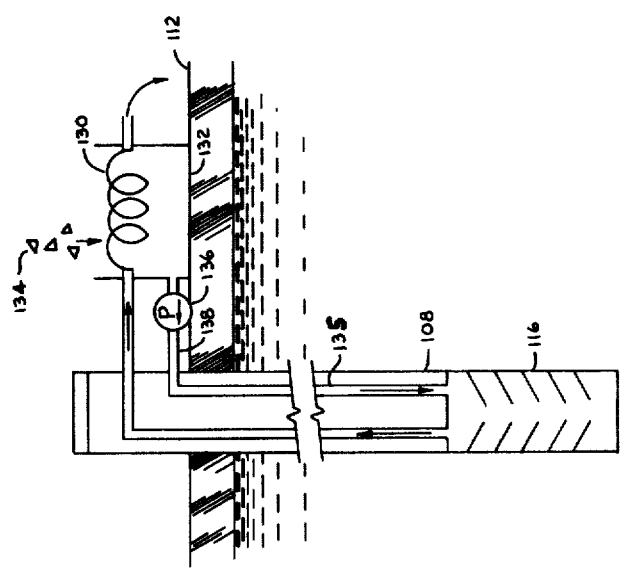
FIG. 7 is a schematic view of a heat exchange geothermal well utilized to melt ice as the feed water.

The source of fresh water can be provided as shown in FIG. 7 by circulating the heated water from the heat exchanger 116 through a coil 130 housed within container 132. When ice 134 is added to container 132, the ice will melt to form fresh water. The water is returned to inlet conduit 135 by means of pump 136 and delivery pipe 138. The heated fluid leaving the coil 130 is then discharged onto the ice layer 142 overlying the channel 54.

Figure 8:
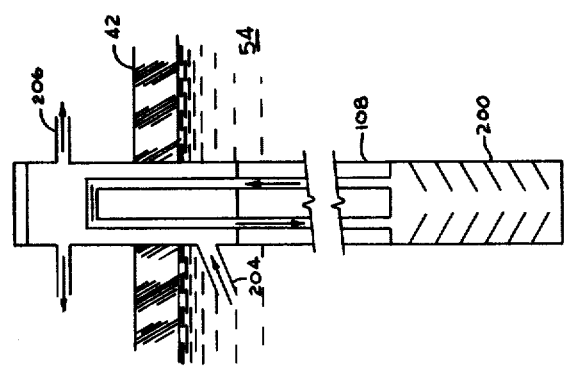
FIG. 8 is a schematic view of a convection circulating heat exchange geothermal well.

Other heat exchange fluids such as Freons or butanes can be utilized in an indirect fluid heating system as illustrated in FIG. 8. The heat exchange fluid such as butane is circulated by convection from the heat exchanger 200 within the geothermal zone through a second heat exchanger 202 near the surface. A secondary heat exchange liquid such as sea water from the channel 54 enters the secondary heat exchanger 202 through inlet 204. The sea water is heated, rises by convection and is discharged onto the ice layer 42 through outlets 206.

Figure 9:
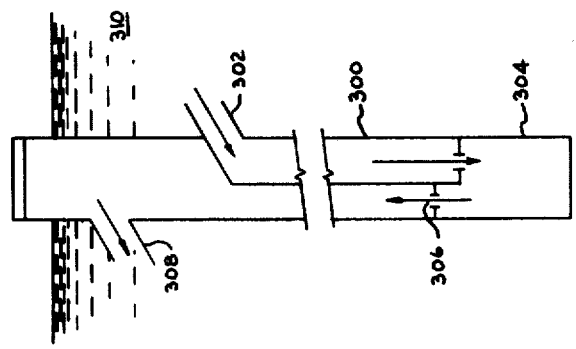
FIG. 9 is a schematic view of a further embodiment of a convection heat exchange geothermal sea-passage system of the invention.

A natural convection system for a dry geothermal zone is illustrated in FIG. 9. The casing 300 contains an inlet pipe 302 extending from below the waterline into the deep lying heat exchanger 304. The cold sea water falls by convection into the heat exchanger 304. The heated sea water leaves through outlet aperture 306 and rises by convection through the casing 300 and is discharged through outlet pipe 308 into the channel 310 on the opposite side of the casing from inlet pipe 302.

It is to be understood that only preferred embodiments of the invention have been described and that numerous substitutions, modifications and alterations are all permissible without departing from the spirit and scope of the invention as defined in the following claims.

What is claimed is:

1. A method of forming an open shipping channel between two navigable bodies of water separated by a frozen ice barrier comprising the steps of:
   drilling a plurality of geothermal wells through the surface of the earth lying beneath the ice and water into a deep, hot rock geothermal subsurface strata spaced along a route joining the bodies of water;
   transferring heated fluid at a temperature of at least 100°F from the lower hot end of each well to a surface of the frozen ice barrier in an amount sufficient to melt the frozen ice barrier until the frozen ice barrier melts to form a water filled channel joining the wells and the bodies of water into a continuous open, navigable shipping channel at least 80 feet in width; and lining at least one side of the channel with a wall of thermal insulating material, extending above the wave and water line.

2. A method according to claim 1 further comprising the step of drilling at least one of the wells into a wet and pressurized geothermal strata and transferring heated fluid from the wet strata onto a surface of the frozen ice barrier.

3. A method according to claim 1 further comprising the step of drilling at least one of the wells into a dry and hot geothermal strata, disposing a heat exchanger within the strata, and delivering a cold heat exchanger medium to the heat exchanger, heating the medium therein and utilizing the heated medium to melt said ice barrier.

4. A method according to claim 3 further comprising the step of passing the heated medium through a second heat exchanger in indirect heat exchange contact with a fluid, and discharging the heated fluid onto a surface of the frozen ice barrier.

5. A method according to claim 3 in which the heated medium is water and said heated water is discharged onto a surface of the frozen ice barrier.

6. A method according to claim 5 further including the step of positioning a portion of the route along the direction of prevailing winds to create wave action and water movement within the channel.

7. A method according to claim 6 further including the steps of discharging oil into the channel, floating the oil downstream and collecting the oil.

8. A method according to claim 1 in which the heated fluid is applied to the upper surface of the frozen ice barrier.

9. A method according to claim 1 further including the step of lining both sides of the channel with a wall of thermal insulating lightweight concrete material.

* * * * *